United States Patent [19]

Inabayashi et al.

[11] 4,148,532
[45] Apr. 10, 1979

[54] ADJUSTABLE SHAFT BEARING STRUCTURE

[75] Inventors: Akira Inabayashi, Aki; Harumi Ninomiya, Kure, both of Japan

[73] Assignee: Toyo Kogyo Co., Ltd., Aki, Japan

[21] Appl. No.: 877,814

[22] Filed: Feb. 14, 1978

[30] Foreign Application Priority Data

Feb. 19, 1977 [JP] Japan .................................. 52-17405

[51] Int. Cl.² ............................................ F16C 17/00
[52] U.S. Cl. ....................................... 308/36; 296/146
[58] Field of Search ................. 296/84 N, 146; 308/1, 308/2, 8, 36, 237, 26, 15

[56] References Cited

U.S. PATENT DOCUMENTS

| | | | |
|---|---|---|---|
| 3,948,430 | 4/1976 | Koike | 296/146 X |
| 3,961,821 | 6/1976 | Mistopoulos, Jr. | 296/146 |

*Primary Examiner*—Douglas C. Butler
*Attorney, Agent, or Firm*—Wenderoth, Lind & Ponack

[57] ABSTRACT

A friction bearing structure for the adjustable support of a ventilator window shaft employed in an access door of an automotive vehicle, which comprises a base block having a rigid tongue member and a support hole, and a movable tongue member cooperative with the rigid tongue member. The rigid and movable tongue members have their respective surface area so shaped as to tightly contact the ventilator window shaft under friction so that, once the ventilator window is rotated to any desired position from a closed position, the ventilator window can be retained in position at such desired position. The structure further comprises a wedge member having a mounting hole through which an adjustment screw member loosely extend, and a pressure backing member for backing up a pressure exerted by the wedge member when the latter is held in position with the adjustment screw member being fastened into the support hole so that the pressure can be directed towards the movable tongue member.

11 Claims, 10 Drawing Figures

ADJUSTABLE SHAFT BEARING STRUCTURE

The present invention generally relates to a ventilator window on an access door in an automotive vehicle and, more particularly, to a friction bearing structure for the adjustable support of a ventilator window shaft.

It is well known that, in some models of automotive vehicles, a substantially triangular ventilator window is employed for each access door, in the case of the automotive vehicle being of a type having one pair of opposed access doors, or for each front access door in the case of the automotive vehicle being of a type having front and rear pairs of opposed access doors. Such a triangular ventilator window generally has a pair of coaxially aligned shafts which extend outwards in the opposed directions with each other from a ventilator window frame and about which the ventilator window can rotate to any desired position between closed and full open positions, that is, substantially intermediately of the angular path through which the ventilator window can rotate.

For the purpose of retaining the ventilator window firmly at the desired position including the full open position after it has been rotated to such desired or full open position irrespective of a wind force which may act on the ventilator window during running of the automotive vehicle, one of the coaxially aligned shafts extending from the ventilator window frame, in particular, the lower shaft adjacent the body of the access door, is supported under friction by a friction bearing structure set in the body of the access door.

One example of prior art friction bearing structure is disclosed in the Japanese Utility Model Publication (Examined) No. 50-23927, published on July 18, 1975, and is also illustrated in FIG. 2 of the accompanying drawings in longitudinal sectional view.

Referring to FIG. 2, the conventional friction bearing structure comprises a bearing member 1 having a tapering bore 2 defined therein and into which a sleeve member 3 having its outer periphery shaped in complementary relation to the tapering shape of the bore 2 in the bearing member 1 is inserted. The bearing member 1 is set in the access door and secured in position to a door window frame or door panel 4 with a large diameter open end of the bore 2 facing downwards while a lower shaft 5 extending from a ventilator window frame rotatably extends through the hollow in the sleeve member 3 then inserted in the bore 2. The sleeve member 3 is normally urged upwards towards the ventilator window by a compression spring 6 mounted around a lower end portion of the ventilator window shaft 5 and positioned between the large diameter end of the sleeve member 3 and a stop ring 7, said stop ring 7 being mounted in position on the lower end portion of the shaft 5 by an adjustment nut 8 which is adjustably threaded to the lower end portion of the ventilator window shaft 5.

The conventional friction bearing structure of the construction shown in FIG. 2 is so designed that a force exerted by the compression spring 6 on the sleeve member 3 causes the sleeve member 3 to be upwardly biased with the reduced diameter end portion of the sleeve member 3 being urged to contact the tapering bore 2 of the bearing member 1, thereby imparting a friction to rotation of the ventilator window shaft 5. The friction so developed between the bearing member 1 and the sleeve member 3 is adjustable by turning the adjustment nut 8 in either direction about the longitudinal axis of the ventilator window shaft 5.

The conventional friction bearing structure of the above described construction and shown in FIG. 2 may be satisfactory in that the ventilator window, once it has been rotated from the closed position to any desired position including the full open position, can be retained in such desired or full open position even though a wind force acts on the ventilator window during the running of the automotive vehicle. In addition, where one or both of the sleeve member 3 and the bearing member 1 wear under friction to such an extent that the ventilator window moved, for example, to the desired position intermediately of the angular path through which it can be rotated can no longer withstand the wind force acting to return the ventilator window to the original, closed position, the adjustment nut 8 has to be fastened to cause the compression spring 6 to ultimately develop between the sleeve member 3 and the bearing member 1 a frictional force sufficient and necessary to retain the ventilator window at any desired position.

However, it has been found that the conventional friction bearing structure involves the following disadvantages and inconveniences.

(1) The access door, particularly, an inboard panel forming a part of the access door and facing the interior of the automotive vehicle, must have an access opening through which an adjusting instrument, such as a wrench or spanner, necessary to turn the adjustment nut 8 can be inserted. The provision of such access opening in turn requires a cap or covering necessary to close the access opening each time the adjustment of the nut 8 has been effected. This provides a substantial obstruction to a handsome-looking feature of the interior finish in the vehicle.

(2) Fitting of some of the components of the friction bearing structure and subsequent adjustment of the adjustment nut 8 must be performed from bottom or sideways of the access door. This is a complicated procedure and requires a skilled attendant worker, or otherwise some of the components of the friction bearing structure, for example, the adjustment nut 8 will be slipped out of alignment with the ventilator window shaft and into the bottom of the access door of double-layered structure.

(3) Where metal-to-metal contact takes place at least between the door panel 4 and the ventilator window shaft 5, the relative frictional movement between the door panel 4 and the ventilator window shaft 5 accompanies generation of noisy squeaking sounds which are not comfortable to hear.

Accordingly, the present invention has been developed to substantially eliminate the above described disadvantages and inconveniences inherent in the prior art friction bearing structure for the adjustable support of the ventilator window shaft and has for its primary object to provide an improved friction bearing structure which can be set in the access door from top and wherein adjustment of the friction to be imparted to the ventilator window shaft for the purpose described hereinbefore can, therefore, be performed from top without the access opening being required in the access door assembly.

Another important object of the present invention is to provide an improved friction bearing structure of the type described above, wherein one or more components of the improved friction bearing structure which contact the ventilator window shaft, usually made of a metallic material, are made of a synthetic resin of high stiffness so that any possible generation of noisy squeaking sounds resulting from the metal-to-metal contact can advantageously be suppressed.

A further important object of the present invention is to provide an improved friction bearing structure of the type described above, which can readily and easily be manufactured at low cost due to the employment, in combination with a readily available plastic molding technique, of the synthetic resin of high stiffness as a material for some or all of the components of the improved friction bearing structure.

According to the present invention, the friction bearing structure for the adjustable support of the ventilator window shaft generally comprises a base block having a rigid tongue member and a support bore, and a movable tongue member cooperative with said rigid tongue member, said rigid and movable tongue members having their respective surface area so shaped as to define a substantially circular-sectioned bearing bore which is adapted to support the ventilator window shaft for adjustable rotation about the longitudinal axis of said bearing bore. In order to impart a friction to the ventilator window shaft received in the bearing bore for the purpose as hereinbefore described, the friction bearing structure further comprises a wedge member having a mounting hole through which an adjustment screw member loosely extends, and means for backing up a pressure, exerted by the wedge member when the latter is held in position between said backing means and said movable tongue member in a manner with the adjustment screw member extending loosely through the mounting hole in the wedge member and threaded into the support bore in the base block, so that the pressure can be directed towards the movable tongue member to cause the latter to be biased in a direction close towards the rigid tongue member.

In one preferred embodiment of the present invention, the movable tongue member and the wedge member ae all integrally formed with the base block to provide the friction bearing structure of one-piece construction. In this embodiment, the backing means referred to above is constituted by a pliable connection through which the wedge member is integrally connected to the base block. This wedge member is, as the adjustment screw member is fastened with its threaded end portion remote from its head portion adjustably engaged into the support bore in the base block, pivoted about a line of pivot provided by the pliable connection so that a portion of the wedge member opposed to the connection can press the movable tongue member in a direction close towards the rigid tongue member.

In another preferred embodiment of the present invention, the base block and the backing means are of one-piece construction on one hand and the movable tongue member and the wedge member are of one-piece construction on the other hand.

In all cases, the components of the friction bearing structure according to the present invention except for the adjustment screw member are made of a synthetic resin having a high stiffness. The synthetic resin of high stiffness which can be employed as a material for the friction bearing structure of the present invention is any one of thermoplastic resins, such as nylon, polybutylene terephthalate and polyacetal, mixed with a reinforcement such as glass fibers, talc or $CaCO_3$, or any one of thermosetting resins, such as phenol resins and unsaturated polyester mixed with a reinforcement such as glass fibers, talc or $CaCO_3$.

As another feature of the present invention, the adjustment screw member can, whenever the friction adjustment is required, be accessible from top without requiring any complicated adjustment procedure. This adjustment screw member may be made of either a metallic material or such a synthetic resin as generally employed as a material for screw members.

These and other objects and features of the present invention will become apparent from the following description taken in conjunction with preferred embodiments thereof with reference to the accompanying drawings, in which.

Figure 5:
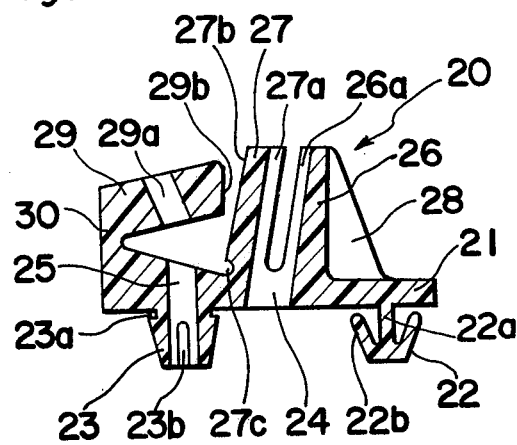
FIG. 5 is a longitudinal side sectional view of the friction bearing structure shown in FIG. 4, but removed from the access door.
Figure 6:
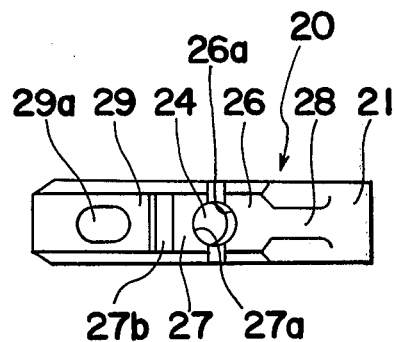
FIG. 6 is a top plan view of FIG. 5.
Figure 7:
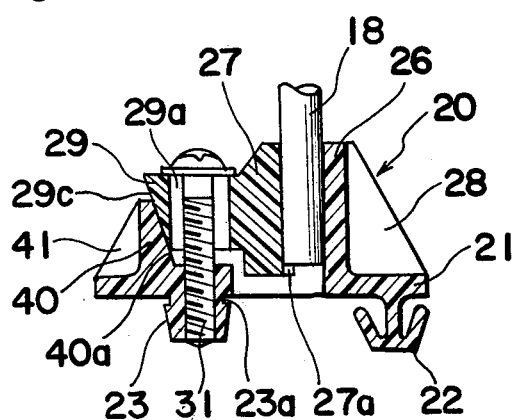
Figure 8:
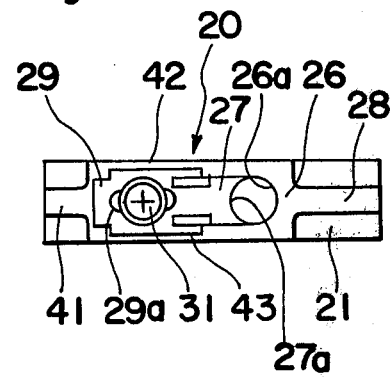
Figure 9:
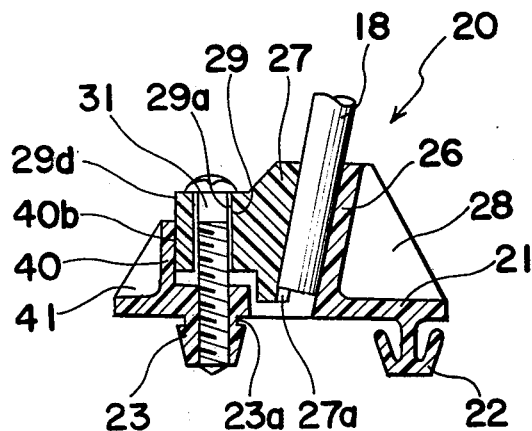
Figure 10:
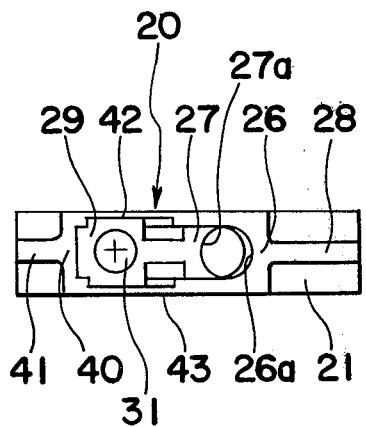

FIGS. 7 and 8 are views similar respectively to FIGS. 5 and 6, showing the friction bearing structure according to another preferred embodiment of the present invention; and FIGS. 9 and 10 are views similar respectively to FIGS. 5 and 6, showing the friction bearing structure according to a further preferred embodiment of the present invention.

Before the description of the present invention proceeds, it is to be noted that like parts are designated by like reference numerals throughout the accompanying drawings.

Figure 1:
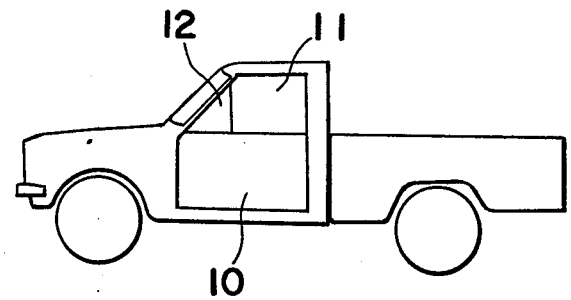
FIG. 1 is a schematic side view of an automotive vehicle showing the position of a ventilator window.
Figure 2:
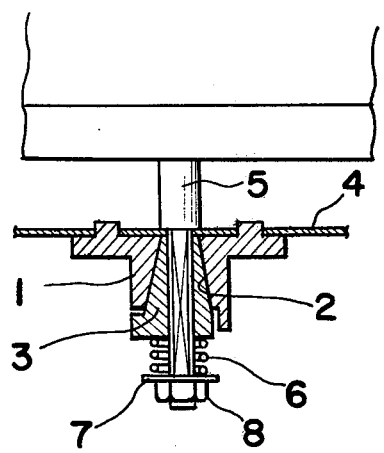
FIG. 2 is a longitudinal sectional view of the prior art friction bearing structure for the adjustable support of a shaft carried by the ventilator window.
Figure 3:
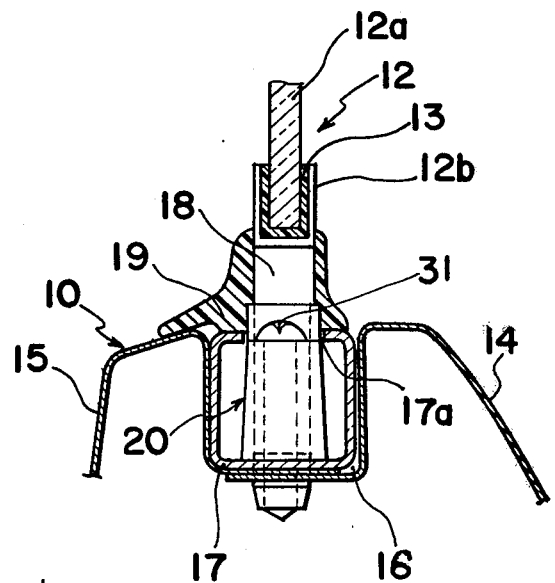
FIG. 3 is a longitudinal sectional view, as viewed in a direction substantially at right angles to a plane of an access door of the automotive vehicle, showing a friction bearing structure according to one preferred embodiment of the present invention as installed on the access door.

Referring first to FIGS. 1 and 3, an access door for selectively opening and closing an entrance leading into the interior, for example, a driver's seat, of an automotive vehicle is shown to have a side window 11 and a substantially triangular ventilator window 12 as is well known to those skilled in the art. Usually, the ventilator window 12 is composed of a window glass 12a and a window frame 12b of substantially U-shaped section either entirely or partially surrounding the periphery of the window glass 12a through a weather strip 13.

On the other hand, as best shown in FIG. 3, the access door 10 is generally known as composed of inboard and outboard door panels 14 and 15 having their respective peripheral portions connected to each other with a door framework (not shown) interposed therebetween. However, so far as illustrated, upper peripheral portions of the respective inboard and outboard door panels 14 and 15 are so shaped as to define a substantially U-sectioned groove 16 when connected to each other directly or through a portion of the door framework, said groove 16 substantially extending a distance corresponding to the length of the base portion of the ventilator window 12 and accomodating therein a window support beam 17 of substantially U-sectioned shape. This window support beam 17 is steadily installed in any known manner into the groove 16 with an elongated opening 17a facing upwards and towards the ventilator window 12.

The ventilator window 12 so far described is pivotable between closed and full open positions as is well known to those skilled in the art and, for this purpose, the ventilator window frame 12b has at least one shaft 18 extending outwardly and downwardly therefrom towards the window support beam 17 and rotatably supported by a friction bearing structure to which the present invention pertains.

It is to be noted that, at best shown in FIG. 3, a gap between the window frame 12b and the window support beam 17 is filled up, or otherwise lined, with a weather strip 19 as is well known to those skilled in the art.

Referring now to FIGS. 3 to 6, the friction bearing structure, generally indicated by 20, comprises a base block 21 of substantially rectangular plate-like configuration having an undersurface formed integrally with first and second anchoring members 22 and 23 respectively positioned inwardly of and adjacent the opposed ends of the base block 21. The first anchoring member 22 is in the form of an anchor and is constituted by a stud portion 22a having one end integral with the base block 21 and the other end integrally formed with two or more elastically deformable fingers 22b which extend therefrom in a direction towards the first mentioned end of the stud portion 22a. On the other hand, the second anchoring member 23 is in the form of a sleeve having one end integral with the base block 21 and having its outer periphery axially tapering towards the other end thereof. It is to be noted that, for the purpose as will be described later, the first mentioned end of the second anchoring member 23 is reduced in its outer diameter to provide an annular neck portion 23a. The base block 21 is further formed therein with a bore 24 and a support hole 25 both extending completely through the thickness of the base block 21, said bore 24 being positioned substantially intermediately between the first and second anchoring members 22 and 23 while said support hole 25 is aligned with a through-hole in the second anchoring member 23. It is to be noted that, since the second anchoring member 23 is an integral part of the base block 21 as hereinbefore described, the support hole 25 and the through-hole in the second anchoring member 23 are, in reality, a single support bore.

On the surface of the base block 21 opposed to the above described undersurface thereof, the base block 21 has a rigid tongue 26 and a movable tongue 27 both integrally formed with the base block 21 and extending outwardly therefrom in spaced relation to each other and at a predetermined angle relative to said surface of the base block 21. These tongues 26 and 27 are cooperative with each other to hold the ventilator window shaft 18 therebetween in a manner as will be described in more details later to support the latter.

The rigid tongue 26 has a substantially rectangular surface area inwardly concaved to provide a bearing surface 26a which preferably conform to the curvature of the periphery of the ventilator window shaft 18. This rigid tongue 26 is, for the purpose as will subsequently become clear, backed up by a reinforcement angle piece 28 integrally formed with the base block 21 and the rigid tongue 26.

The movable tongue 27 also has a substantially rectangular surface area facing the inwardly concaved bearing surface 26a of the rigid tongue 26 and correspondingly inwardly concaved to provide a bearing surface 27a which cooperates with the bearing surface 26a to define a bearing bore aligned with the bore 24 in the base block 21, said bearing bore between the inwardly concaved bearing surfaces 26a and 27a being adapted to receive the ventilator window shaft 18 therein. The movable tongue 27 has a flattened surface area 27b opposed to the inwardly concaved bearing surface 27a, which flattened surface area 27b serves as a pressure receiving area as will be discussed later.

In order to facilitate movement of the movable tongue 27 in a manner and for the purpose as will be described later, the movable tongue 27 has one end adjacent the base block 21 formed with a detent 27c extending widthwise of the flattened pressure receiving surface area 27b and about which the movable tongue 27 can, when an external force is applied to the pressure receiving surface area 27b, be forced to deflect towards the rigid tongue 26.

Figure 4:
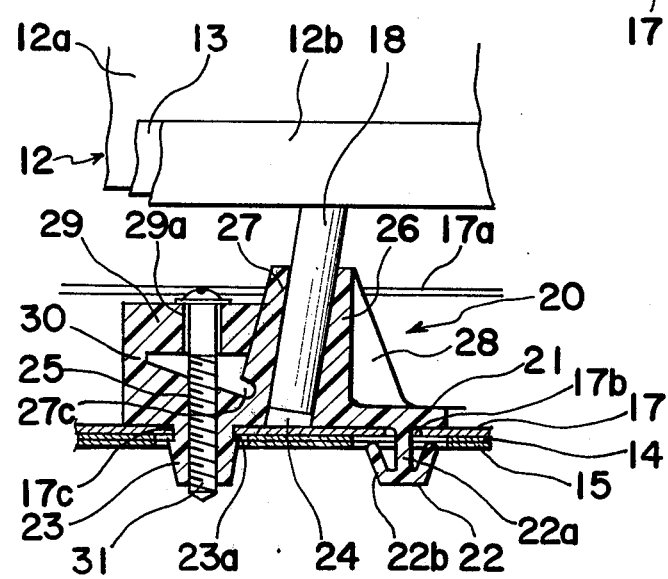
FIG. 4 is a longitudinal side sectional view of the friction bearing structure shown in FIG. 3.

The friction bearing structure 20 further comprises a wedge member 29 in the form of a substantially rectangular block having a hole 29a defined therein and extending completely through the thickness thereof. This wedge member 29 is integrally connected at one corner portion with a corner portion of the base block 21 through a connection 30 and has one end face remote from and substantially opposed to the connection 30 formed into a pressure applying area 29b. This wedge member 29 so connected integrally with the base block 21 is positioned so as to overhang the surface of the base block 21, from which the tongues 26 and 27 outwardly protrude, in such a manner that, unless an adjustment screw member 31 is fastened as will be described later, the pressure applying area 29b is spaced a distance from the pressure receiving surface area 27b of the movable tongue 27. As will become from the subsequent description, when the adjustment screw member 31 is fastened, not only can the hole 29a be aligned with the support bore constituted by the support hole 25 in the base block 21 and the through-hole in the second anchoring member 23, but also the pressure applying area 29b tightly contact the pressure receiving surface area 27b, as best shown in FIG. 4, to cause the movable tongue 27 to deflect towards the rigid tongue 26. It is to be noted that, when the pressure applying area 29b is forced to contact the pressure receiving surface area 27b with the ventilator window shaft 18 received in the bearing bore between the inwardly concaved surfaces 26a and 27a of the respective tongues 26 and 27, a counter-pressure acts on the wedge member 29 tending to move in a direction away from the movable tongue 27. However, this counter-pressure is so backed up by the connection 30, which integrally connects between the wedge member 29 and the base block 21 as hereinbefore described, that the counter-pressure can be directed towards the pressure receiving surface area 27b. For this purpose, the pressure receiving surface area 27b and the pressure applying surface area 29b are so shaped that, as the adjustment screw member 31 is fastened, the pressure applying surface area 29a slides in contact with the pressure receiving surface area 27b while applying a gradually increasing biasing force to said movable tongue 27.

The hole 29a in the wedge member 29 is of such a size as to permit a threaded portions of the adjustment screw member 31 to loosely extend therethrough, but not a head portion of the adjustment screw member 31.

From the foregoing, it has now become clear that all of the components of the friction bearing structure according to the embodiment shown in FIGS. 3 to 6 are of one-piece construction manufactured of a synthetic resin of high stiffness by the use of any known plastic molding technique.

The operation and the mounting procedure of the friction bearing structure of the construction shown in FIGS. 3 to 6 will now be described.

Prior to the ventilator window 12 being installed on the access door 10, the assembly of one-piece construction is inserted into the substantially U-sectioned support beam 17 through the top opening 17a with the undersurface of the base block 21 facing the bottom of the supprt beam 17. When and after the first and second anchoring members 22 and 23 are aligned with respective anchoring holes 17b and 17c defined in the bottom of the support beam 18, the assembly is further downwardly forced with the first and second anchoring members 22 and 23 inserted through the associated anchoring holes 17b and 17c. It is to be noted that, during the insertion of the first and second anchoring members 22 and 23 through the associated anchoring holes 17b and 17c, the fingers 22b of the first anchoring member 22 are elastically deformed radially inwardly of the stud portion 22a while the second anchoring member 23 are elastically radially inwardly compressed. However, after the first and second anchoring members 22 and 23 have been engaged into the associated anchoring holes 17b and 17c in the manner as shown in FIG. 4, the fingers 22a of the first anchoring member 22, which have been elastically deformed radially inwardly of the stud portion 22a, radially outwardly expand due to its own elasticity with the tips of the fingers 22b abutting the bottom of the support beam 18 from below and, on the other hand, the second anchoring member 23, which has been radially inwardly compressed, restores to its original shape due to its own elasticity with an annular edge defining the anchoring hole 17c engaged into the neck portion 23a. In this way, the assembly of one-piece construction can firmly be installed on the access door 10.

After the mounting of the assembly has completed in the manner as hereinbefore described, the ventilator window 12 is then installed with the ventilator window shaft 18 inserted into the bearing bore between the inwardly concaved bearing surfaces 26a and 27a of the respective rigid and movable tongues 26 and 27. Thereafter, the adjustment screw 31 is inserted from top into the hole 29a in the wedge member 29 and then threaded into the support bore constituted by the support hole 25 and the through-hole in the second anchoring member 23. As the adjustment screw member 31 is fastened, the wedge member 29 pivots about the connection 30 on one hand and the pressure applying surface area 29b contacts the pressure receiving surface area 27b on the other hand with the biasing force transmitted from the wedge member 29 to the movable tongue 27. With the biasing force so transmitted, the movable tongue 27, because of the presence of the detent 27c, deflects towards the rigid tongue 26 with the bearing surface 27a tightly contacting a portion of the periphery of the ventilator window shaft 18, thereby imparting a friction to the latter.

From the foregoing, it is clear that, depending upon the extent to which the adjustment screw member 31 is fastened, the friction to be applied to the ventilator window shaft 18 can be adjusted to an appropriate value required to retain the ventilator window at any desired position, including the full open position, once said ventilator window has been rotated thereto about the longitudinal axis of the shaft 18. It is also clear that the biasing force received by the movable tongue 27 to impart the friction between the concaved bearing surface 27a and the periphery of the shaft 18 will not, even if transmitted to the rigid tongue 26 through the shaft 18, cause the rigid tongue 26 to be deflected, because of the presence of the reinforcement angle piece 28. However, depending upon the wall thickness of the rigid tongue 26, the reinforcement angle piece 28 may not be necessary.

It is to be noted that, in order to facilitate the radially inward compression of the second anchoring member 23 during the insertion thereof through the anchoring hole 17c in the support beam 17, the second anchoring member 23 may have a plurality of axially extending grooves 23b defined therein depending upon the type of material for the assembly. Moreover, the bore 24 described as defined in the base block 21 may not be always necessary and may be omitted where the ventilator window shaft 18 terminates substantially halfway of the length of the bearing bore defined between the concave bearing surfaces 26a and 27a.

It is further to be noted that, so far as the pressure applying surface area 29b in the wedge member 29 and the pressure receiving surface area 27b in the movable tongue 27 are so designed as to establish the requisite relationship as substantially hereinbefore described, the rigid and movable tongues 26 and 27 may be so positioned or designed as to have the longitudinal axis of the bearing bore between the concave bearing surfaces 26a and 27b extending either at right angles to the base block 21 or at an acute angle relative to the base block 21 such as shown.

While the friction bearing structure, except for the adjustment screw member, shown in FIGS. 3 to 6 has been described as of one-piece construction, it may be constructed with two separate assemblies, one assembly being constituted by an integral block of the base block including the rigid tongue and first and second anchoring members while the other assembly is constituted by an integral block of the movable tongue and the wedge member, such as shown in any one of FIGS. 7 and 8 and FIGS. 9 and 10.

Referring first to FIGS. 7 and 8, the base block 21 has a back-up wall 40 outwardly protruding therefrom in a direction away from the second anchoring member 23 and having a height smaller than the height of the rigid tongue 26. While one surface area of the back-up wall 40 is connected to the end portion of the base block 21 adjacent the second anchoring member 23 by means of a reinforcement angle piece 41, the other surface area of said back-up wall 40 opposed to said one surface area is downwardly sloped at 40a so as to form an acute angle between the sloped surface area 40a and the longitudinal axis of the support bore which is constituted by the support hole 25 in the base block 21 and the through-hole in the second anchoring member 23. As best shown in FIG. 8, the opposed side edges of the back-up wall 40 are integrally connected to the opposed side edge of the rigid tongue 26 through respective side walls 42 and 43 having their bottom edges integral with the base block 21.

Within a space surrounded by the opposed side walls 42 and 43, the back-up wall and the rigid tongue 26, there is removably accommodated an integral block of the movable tongue 27 and the wedge member 29. It is to be noted that, since the movable tongue 27 and the wedge member 29 in the embodiment shown in FIGS. 7 and 8 form an integral block, they do not have such pressure receiving surface area and pressure applying surface area as employed in the foregoing embodiment of FIGS. 3 to 6 and as designated by 27b and 29b. However, for applying the biasing force necessary to develop a friction between the ventilator window shaft 18 and the movable tongue 27 for the purpose as hereinbefore described, the wedge member 29 integral with the movable tongue 27 has an inclined surface area defined at 29c and downwardly inclined to form an acute angle relative to the direction in which the adjustment screw member 31 is fastened, that is, relative to the longitudinal axis of the hole 29a in the wedge member 29. This inclined surface area 29c of the wedge member 29 is so complementary in shape to the slope 40a of the back-up wall 40 integral with the base block 21 that, as the adjustment screw member 31 loosely extending through the hole 29a is fastened into the support bore which is constituted by the support hole 25 and the through-hole in the second anchoring member 23 as hereinbefore described, the integral block of the movable tongue 27 and the wedge member 29 can be displaced in a direction away from the back-up wall 40 with the surface area 29c sliding along and in contact with the slope 40a.

From the foregoing, it is clear that, after the ventilator window shaft 18 has been inserted into the space surrounded by and defined by the opposed side walls 42 and 43, the back-up wall 40 and the rigid tongue 26, and after the integral block of the movable tongue 27 and the wedge member 29 has subsequently been inserted into the same space with the hole 29a aligned with the support bore while the movable tongue 27 is positioned relative to the rigid tongue 26 in a manner with the ventilator window shaft 18 held between the bearing surface areas 26a and 27a, the adjustment screw member 31 loosely extending through the hole 29a is fastened to allow the integral block of the movable tongue 27 and the wedge member 29 to be moved downwardly in a direction close towards the bottom of the U-sectioned beam 17 (FIG. 3) and, at the same time, laterally of the fastening direction of the screw member 31. By so doing, the ventilator window shaft 18 can be retained in position within the bearing bore between the bearing surface areas 26a and 27a under friction.

Nevertheless, the mounting of the friction bearing structure according to the embodiment shown in FIGS. 7 and 8 can also be carried out in a manner similar to that described in connection with the embodiment described with reference to FIGS. 3 to 6.

It is to be noted that, in FIGS. 7 and 8, the bearing bore defined between the bearing surface areas 26a and 27a is shown to extend at right angles to the base block 21 and in parallel relation to the fastending direction of the adjustment screw member 31, but it may be inclined such as shown in FIGS. 4 to 6. However, where the bearing bore having its longitudinal axis extending downwardly to form an acute angle relative to the fastening direction of the adjustment screw 31 is desired to be formed in the friction bearing structure of the construction shown in FIGS. 7 and 8, the surface areas, which have respectively been designated by 29c and 40a in FIGS. 7 and 8, may have their respective planes parallel to the longitudinal axis of the hole 29a and substantially at right angles to the base block 21 such as shown by 29d and 40b in FIGS. 9 and 10.

Even the friction bearing structure of the construction shown in FIGS. 9 and 10 functions in a substantially similar manner to that shown in FIGS. 7 and 8 in view of the fact that, as the integral block of the movable tongue 27 and the wedge member 29 is downwardly displaced with the adjustment screw member 31 fastened, the distance between the bearing surface areas 26a and 27a decreases to compensate for any possible clearance between the peripheral surface of the ventilator window shaft 18 and any one of the bearing surface areas 26a and 27a.

From the foregoing description of the present invention, it has now become clear that the friction bearing structure according to the present invention involves the following advantages.

(a) No access opening heretofore required for the adjustment instrument, such as a wrench or spanner, to be inserted therethrough is required in the door panel since the friction bearing structure of the present invention can be installed on the door from top. Therefore, the handsomelooking feature of the interior finish in the vehicle can be preserved.

(b) Since the mounting of the friction bearing structure on the access door of the automotive vehicle and the friction adjustment by turning the adjustment screw member can both be carried out from top, no complicated mounting and/or adjusting procedures are required with improvement in work efficiency.

(c) Where all of the components of the friction bearing structure of the present invention including or excluding the adjustment screw member are made of the synthetic resin of high stiffness, the friction bearing structure can readily and easily be manufactured at low cost and, when used in practice to support the ventilator window shaft made of a metallic material, the possibility of generation of noisy squeaking sounds due to metal-to-metal contact can be avoided.

Preferably, the synthetic resin of high stiffness as a material for the friction bearing structure of the present invention is polybutylene terephthalate containing 30% fiber glass.

Although the present invention has fully been described in connection with the preferred embodiments thereof, it is to be noted that various changes and modifications are apparent to those skilled in the art. By way of example, where desired, the friction bearing structure may be made of a readily castable metallic material, such as aluminum or its alloy. It is also possible that either one of the integral block of the movable tongue 27 and the wedge member and the integral block of the rigid tongue 26 and the base block 21 is made of such metallic material. In particular, where the integral block of the movable tongue 27 and the wedge member 29 is made of the metallic material, no first and second anchoring members such as designated by 22 and 23 are required and, instead thereof, the base block 21 must have two or more holes through which set screws are inserted for securing the friction bearing structure to the access door.

Therefore, these changes and modifications are to be understood as included within the true scope of the present invention unless they depart therefrom.

What is claimed is:

1. A friction bearing structure adapted to be installed on an access door of an automotive vehicle of a type having an open-topped groove of substantially U-shaped cross section for the adjustable support of a ventilator window shaft, which comprises, in combination:

a base block having a rigid tongue member outwardly protruding therefrom and having a portion formed into a bearing surface area of substantially semi-circular cross section, said base block further having a support hole;

a movable tongue member having a portion formed into a bearing surface area of substantially semi-circular cross section, said bearing surface areas in said respective rigid and movable tongue members being so cooperative with each other and so shaped as to define a substantially circular-sectioned bearing bore for the support of the ventilator window shaft;

a wedge member having a mounting hole;

an adjustable screw member adapted to loosely extend through said mounting hole in said wedge member, said wedge member, when said adjustment screw member loosely extending through the mounting hole is threaded into said support hole in the base block, applying a biasing force to said movable tongue member to shift the latter towards the rigid tongue member whereby the ventilator window shaft frictionally contacts the respective bearing surface areas of the rigid and movable tongue members; and means for backing a pressure, exerted by the wedge member when the latter is held in position to apply the biasing force to the movable tongue member, so that the pressure can be directed towards the movable tongue.

2. A friction bearing structure as claimed in claim 1, wherein said base block, said movable tongue member, said wedge member and said backing means are made of a synthetic resin having a high stiffness.

3. A friction bearing structure as claimed in claim 1, wherein said base block, said movable tongue member, said wedge member and said backing means are of one-piece construction.

4. A friction bearing structure as claimed in claim 1, wherein said base block is of substantially rectangular shape, said rigid and movable tongue members having their respective ends integrally formed with one surface of said base block and extending outwards therefrom in parallel relation to each other with said bearing surface areas of said respective rigid and movable tongue members facing each other, said wedge member having a portion integrally connected to one end of said base block remote from the rigid tongue member and another portion spaced a distance from another surface area of said movable tongue member which is opposed to the bearing surface area of said movable tongue member, said another portion of said wedge member, when the adjustment screw member loosely extending through the mounting hole in the wedge member is fastened into the support hole, contacting said another surface area of said movable tongue member to apply the biasing force.

5. A friction bearing structure as claimed in claim 4, wherein said base block further has first and second anchoring members outwardly protruding from an undersurface of the base block opposed to said one surface in a direction opposed to the direction in which the rigid and movable tongue members outwardly extend, said first and second anchoring members being adapted to steadily connect the friction bearing structure to the bottom of the open-topped groove in the access door after it has been mounted on the access door from top.

6. A friction bearing structure as claimed in claim 1, wherein said base block is of substantially rectangular shape, said rigid tongue member having one end integrally connected to one surface of said base block and outwardly protruding therefrom, and said backing means being constituted by a wall member outwardly protruding from said one surface of said base block and having a pair of opposed side edges integrally connected with side edges of the rigid tongue member which are on respective sides of the bearing surface area of said rigid tongue member, and wherein said wedge member has a portion integrally connected with another surface area of the movable tongue member which is opposed to the bearing surface area of said movable tongue and also has another portion slidingly engageable to one wall surface of the wall member which faces the bearing surface area of the rigid tongue member.

7. A friction bearing structure as claimed in claim 6, wherein said another portion of said wedge member is downwardly inclined to form an acute angle between it and the longitudinal axis of the mounting hole and said one wall surface of the wall member being so complementary to the downwardly inclined another portion of the wedge member that, as an integral block of said wedge member and said movable tongue member is drawn in a direction close towards the base block with the adjustment screw member being fastened, the distance between the bearing surface areas of the respective rigid and movable tongue members gradually decrease.

8. A friction bearing structure as claimed in claim 7, wherein said base block further has first and second anchoring members outwardly protruding from an undersurface of the base block opposed to said one surface in a direction opposed to the direction in which the rigid tongue member outwardly extends, said first and second anchoring members being adapted to steadily connect the friction bearing structure to the bottom of the open-topped groove in the access door after it has been mounted on the access door from top.

9. A friction bearing structure as claimed in claim 6, wherein said another portion of said wedge member and said one wall surface of the wall member extend at right angles to said one surface of the base block while the longitudinal axis of the bearing bore between the bearing surface areas of the respective rigid and movable tongue members extend at an acute angle relative to the direction in which the adjustment screw member is fastened.

10. A friction bearing structure as claimed in claim 9, wherein said base block further has first and second anchoring members outwardly protruding from an undersurface of the base block opposed to said one surface in a direction opposed to the direction in which the rigid tongue member outwardly extends, sad first and second anchoring members being adapted to steadily connect the friction bearing structure to the bottom of the open-topped groove in the access door after it has been mounted on the access door from top.

11. A friction bearing structure as claimed in claim 1, wherein said bearing structure is of two-piece construction in which said base block and said backing means are integrally formed with each other and said movable tongue member and said wedge member are integrally formed with each other.

* * * * *